United States Patent [19]

Huang

[11] Patent Number: 5,020,781
[45] Date of Patent: Jun. 4, 1991

[54] CONTROLS FOR A SEMIACTIVE CHASSIS

[75] Inventor: Zhen Huang, Wuppertal, Fed. Rep. of Germany

[73] Assignee: August Bilstein GmbH & Co. KG, Ennepetal, Fed. Rep. of Germany

[21] Appl. No.: 540,369

[22] Filed: Jun. 19, 1990

[30] Foreign Application Priority Data

Jun. 20, 1989 [DE] Fed. Rep. of Germany ....... 3920049

[51] Int. Cl.$^5$ .................. F16M 1/00; B60G 17/00
[52] U.S. Cl. .................. 267/136; 188/299; 188/378; 188/280; 280/707
[58] Field of Search ............ 188/378, 379, 380, 299, 188/280, 285; 280/707, 708, 714; 267/136; 248/550; 180/300; 364/424.05

[56] References Cited

U.S. PATENT DOCUMENTS

| 4,527,676 | 7/1985 | Emura et al. | 188/299 |
| 4,546,960 | 10/1985 | Abrams et al. | 267/136 |
| 4,735,296 | 4/1988 | Pinson | 267/136 X |
| 4,742,998 | 5/1988 | Schubert | 267/136 |
| 4,869,474 | 9/1989 | Best et al. | 267/136 |
| 4,887,699 | 12/1989 | Ivers et al. | 188/299 X |
| 4,907,680 | 3/1990 | Wolfe et al. | 188/299 |

Primary Examiner—Douglas C. Butler
Attorney, Agent, or Firm—Max Fogiel

[57] ABSTRACT

The invention concerns controls for a semiactive chassis on a motor vehicle that is provided with variable or power-regulated vibration attenuators. The results of various sensor measurements are supplied to a regulator that controls the settings in the vibration attenuators on the sky-hook principle.

4 Claims, 1 Drawing Sheet

CONTROLS FOR A SEMIACTIVE CHASSIS

The invention concerns controls for a semiactive chassis for a motor vehicle. The weight of an over-the-road vehicle is suspended not only by way of individual forces that engage the wheels but also by that of static or dynamic buoyancy. Common to every field of application is the tendency of the vehicle to vibrate by way of the suspension due to non-uniformities in the suspending medium. This tendency occurs in motor vehicles and hence in over-the-road vehicles when they travel over the to some extent unavoidably irregular roads. Such recurring vehicle vibrations, however, make the ride less comfortable and the vehicle less safe and accordingly stress the passengers and cargo.

This stress can be reduced with a resilient body suspension and shock absorption, and any vibrations that occur or are introduced will be more or less attenuated on their way to the passengers. A lot can be filtered out ahead of time, with resilient tires for example, which will to some extent compensate for any extensive irregularities in the road.

How effectively the body vibrations can be reduced depends essentially on how free the choice is of the vehicle parameters that have to be taken into account. This freedom is much more restricted for the body mass than it is for the body suspension and shock absorption. Any variations in a suspension parameter or in a vibration attenuator on the vehicle will accordingly inhibit the vibrational behavior of the vehicle as a whole.

BACKGROUND OF THE INVENTION

Any vehicle that compensates considerably for irregularities in the road and hence in the consequent shifts in the position of the axle and accordingly exposes its passengers to only a low level of motion is characterized as comfortable. The motion induced in the passengers is accordingly generally considered the measure of comfort within the context of vibration.

European Exposure 270 893 discloses a mechanism for actively controlling a motor-vehicle chassis. The level is controlled in conjunction with associated active or semiactive attenuators plus passive spring or attenuating mechanisms. The device, however, is very complicated and does not represent a cost-effective solution. Furthermore, the number of components is very large, making the whole system likely to malfunction. A principle of controlling semiactive chassis called the skyhook principle is known. In accordance with this principle, if Va represents the vertical body velocity and Vr the vertical wheel velocity, a bypass valve is closed when $Va \cdot (Va-Vr) \leq$, subsequent to which the attenuator operates with a hard characteristic.

When $Va \cdot (Va-Vr) <$, the bypass valve is opened, subsequent to which the vibration attenuator will operate with a soft characteristic. Vertical body velocity Va is determined by a sensor that integrates body acceleration $a_a$. This method of determination is not only very complicated but does not calculate body velocity precisely enough for the subsequent controlling process.

SUMMARY OF THE INVENTION

The object of the present application is to provide controls for a semiactive motor-vehicle chassis that will not be subject to malfunctions, that is simple in design, and that makes the ride very comfortable for the passengers. The controls are also to be continuously variable to ensure even more comfort. Furthermore, the controls should be adaptable to a variable vibration attenuator or damper and to a power-regulated vibration attenuator.

This object is attained in accordance with the invention. What is important here is that no integration stages are employed, thereby eliminating delays in the control sequence or cycle.

The difference between the velocity of the wheel mass and that of the body mass of a motor vehicle can be determined as described in OS 3 909 190 with a sensor. A different approach employs a power-regulated vibration attenuator with a proportional valve, and the force sensor measures the body mass and its components.

BRIEF DESCRIPTION OF THE DRAWINGS

Embodiments of the invention will now be described with reference to the drawings, wherein.

DESCRIPTION OF THE PREFERRED EMBODIMENTS

Figure 1:
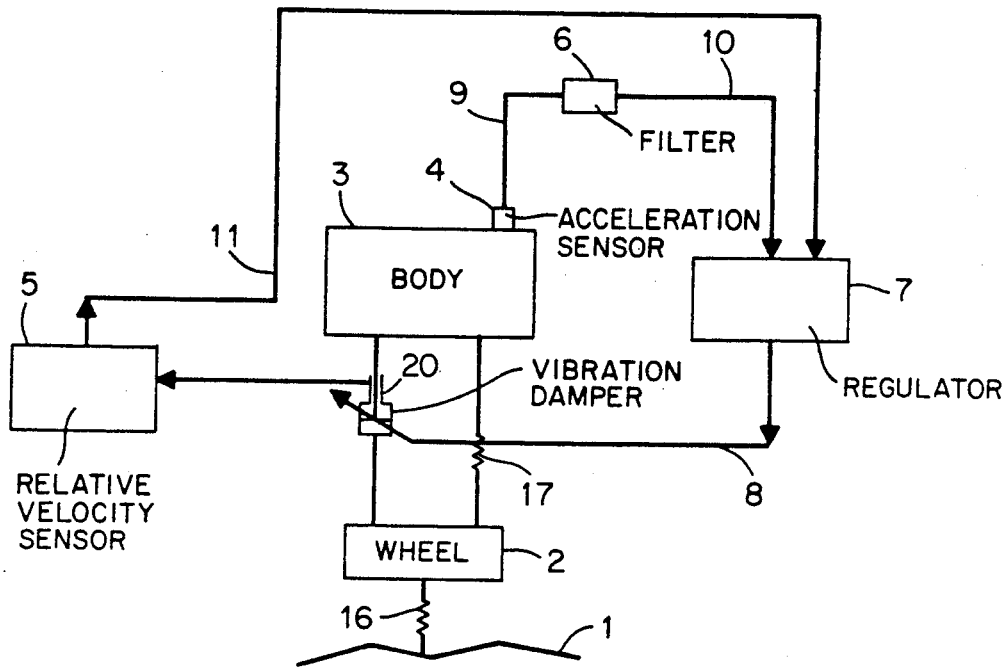
FIG. 1 is a block diagram illustrating the principle behind a variable vibration attenuator with a bypass valve and FIG. 2 is a block diagram illustrating the principle behind a power-regulated vibration attenuator with a proportional valve.

In eliminating the aforesaid drawbacks of the known system, the present invention operates on the assumptions that the bypass valve is closed when $a_a \cdot (Va-Vr) > 0$ and the bypass valve is open when $a_a \cdot (Va-Vr) < 0$, where $a_a$ is the body acceleration, VA the body velocity, and Vr the vertical wheel velocity. When relative velocity $> 0$, vibration attenuator will be operating in the suction stage and, when relative velocity $< 0$, the vibration attenuator will be operating in the compression stage.

A wheel suspension 16 is in contact with the surface of a road 1. Mounted on the suspension is a wheel mass 2. A spring 17 intervenes between wheel mass 2 and a body mass 3. A relative-velocity sensor 5 determines the difference between velocities of wheel mass 2 and body mass 3. The resulting signal 11 is forwarded to a regulator 7 by way of an electric connection. A sensor 4 on body mass 3 determines the acceleration of that mass and forwards the result to a filter 6 by way of electric connection 9. The filter eliminates interference above a certain threshold. The filtered signal arrives at regulator 7 by way of a connection 10. The regulator calculates from the acceleration result and from the relative-velocity signal a parameter that is forwarded to the vibration attenuator or damper 20 by way of an electric connection 8. The regulating activity of the vibration attenuator is accordingly affected by the setting 8 of regulator 7, assuming of course that the attenuator is variable. This regulating principle allows the vibration attenuator's characteristic to be established as either hard or soft.

Figure 2:
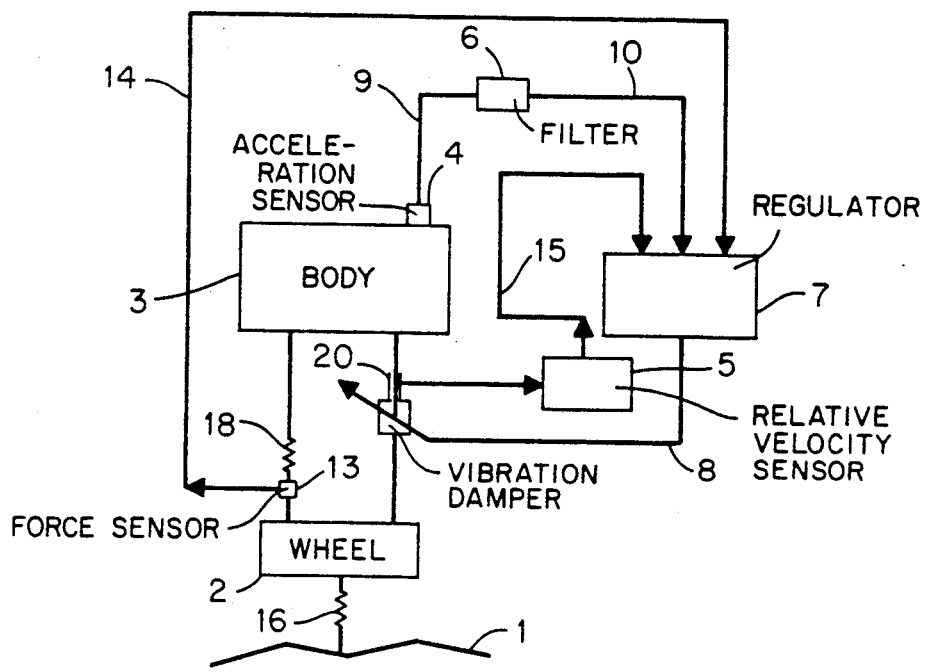

The circuitry illustrated in FIG. 2 is associated with a semiactive chassis with a power-regulated vibration attenuator. This principle represents even greater riding comfort because it is the wheel force or mass distribution that is measured with a force sensor 13. When velocity V=0, the instantaneous value is stored and the vertical body acceleration is again determined by a sensor 4 on body mass 3. The result signal travels over connection 9 to a filter. The output from the filter is forwarded to a regulator 7 by way of connection 10. Force sensor 13, which is mounted on a spring 18 between wheel mass 2 and body mass 3, also supplies its results to regulator 7 by way of a connection 14. The difference in the velocities of body mass 3 and of wheel mass 2 is also measured, however, with a relative-velocity sensor 5. The result travels to regulator 7 by way of a connection 15. Regulator 7 calculates a deviation from the available result signals and from the stored or entered values and supplies it to the vibration attenuator or damper 20 by way of connection 8. This approach is based on the principle that resilient attenuation force tends $\to 0$ when $a_a \cdot (Va-Vr) > 0$ and resilient attenuation force = body mass × body acceleration when $a_a \cdot (Va-Vr) > 0$.

This approach allows continuous adjustment. The force of attenuation can be controlled, meaning that attenuation = mass × acceleration. From the aspect of the characteristic, a low curve represents a weak force of attenuation.

In summary, the present invention reduces the vibration and/or shock transmitted from the wheels of a vehicle to the body thereof, by providing a regulating circuit which controls a variable vibration damper with a bypass valve in the vehicle that has a semi-active chassis. In particular, the vibration damper 20 is in the form of, for example, a piston and cylinder device in which the cylinder may be connected to the wheels 2, and the piston is connected to the body 3 of the motor vehicle. A relative velocity sensor 5 determines the relative velocity between the cylinder and the piston of the damper 20, for example, and thereby determines the relative velocity between the wheel 2 and the body 3. The relative velocity sensor 5 is well known in the art, and can consist simply of measuring or sensing the individual velocities of the cylinder and piston, and then taking the difference between the two sensed velocities of the cylinder and piston. The relative velocity sensor may also be made a part of the damper 20.

The output of the relative velocity sensor corresponds to the difference between the velocities of the cylinder and the piston of the damper 20, and this output is applied to an input of the regulator 7. This regulator 7 also receives the output of an accelerator sensor 4, through a filter 6. The output of the regulator 7 is in the form of a control signal that depends on the relative velocity between the cylinder and piston, and the acceleration of the body 3. This output of the regulator 7 controls the bypass valve in the vibration damper 20 to reduce the vibrations that are transmitted from the wheel 2 to the body 3 of the motor vehicle.

When the vibration damper 20 is provided also with a proportional valve, a force sensor is located between the wheel 2 and the body 3. The force sensor 13 has an electrical output, furthermore, which is also applied to an input of the regulator 7. With this arrangement, the control output 8 of the regulator 7 is dependent on the relative velocity between cylinder and piston of damper 20, the output of the acceleration sensor 4, and the output of the force sensor 13.

The vibration damper with bypass valve and proportional valve is known in the art from, for example, U.S. Pat. No. 4,527,676.

I claim:

1. A control arrangement for a semi-active chassis in a motor vehicle with variable vibration dampers having a bypass valve comprising: vehicle wheel means; vehicle body means supported by said wheel means, said wheel means and said body means having each a velocity in traveling over a surface; a relative velocity sensor positioned between said wheel means and said body means for generating a velocity difference signal corresponding to the difference between the velocity of said wheel means and the velocity of said body means; regulator means connected to said relative velocity sensor for receiving said velocity difference signal; an acceleration sensor on said body means for sensing accelerations of said body means and applying a corresponding acceleration signal to said regulator means; signal filter means connected between said acceleration sensor and said regulator means; vibration damper means with a bypass valve located between said wheel means and said body means; said regulator means having an output connected to said vibration damper for controlling opening and closing of said bypass valve dependent on said acceleration signal and said velocity difference signal to reduce vibrations transmitted from said wheel means to said body means.

2. A control arrangement for a semi-active chassis in a motor vehicle with variable vibration dampers having a bypass valve comprising: vehicle wheel means; vehicle body means supported by said wheel means, said wheel means and said body means having each a velocity in traveling over a surface; a relative velocity sensor positioned between said wheel means and said body means for generating a velocity difference signal corresponding to the difference between the velocity of said wheel means and the velocity of said body means; regulator means connected to said relative velocity sensor for receiving said velocity difference signal; an acceleration sensor on said body means for sensing accelerations of said body means and supplying a corresponding acceleration signal to said regulator means; signal filter means connected between said acceleration sensor and said regulator means; vibration damper means with a bypass valve located between said wheel means and said body means; said regulator means having an output connected to said vibration damper for controlling opening and closing of said bypass valve dependent on said acceleration signal and said velocity difference signal to reduce vibrations transmitted from said wheel means to said body means, said bypass valve being closed when $a_a(V_a-V_R) > 0$ and opened when $a_a(V_a-V_R) < 0$, whereby $a_a$ is the body means acceleration, $V_a$ is the body means speed, and $V_R$ is the wheel means speed.

3. A control arrangement as defined in claim 2, wherein said velocity difference signal, said acceleration signal, and said output of said regulator means are all electrical signals.

4. A control arrangement as defined in claim 2, wherein said vibration damper has a proportional valve; a force sensor located between said vehicle wheel means and said vehicle body means and supplying an electrical output signal to an input of said regulator means for additional control of said bypass valve.

* * * * *